Feb. 9, 1932.  J. A. McELROY  1,844,776
WATER HEATER
Filed Aug. 27, 1930
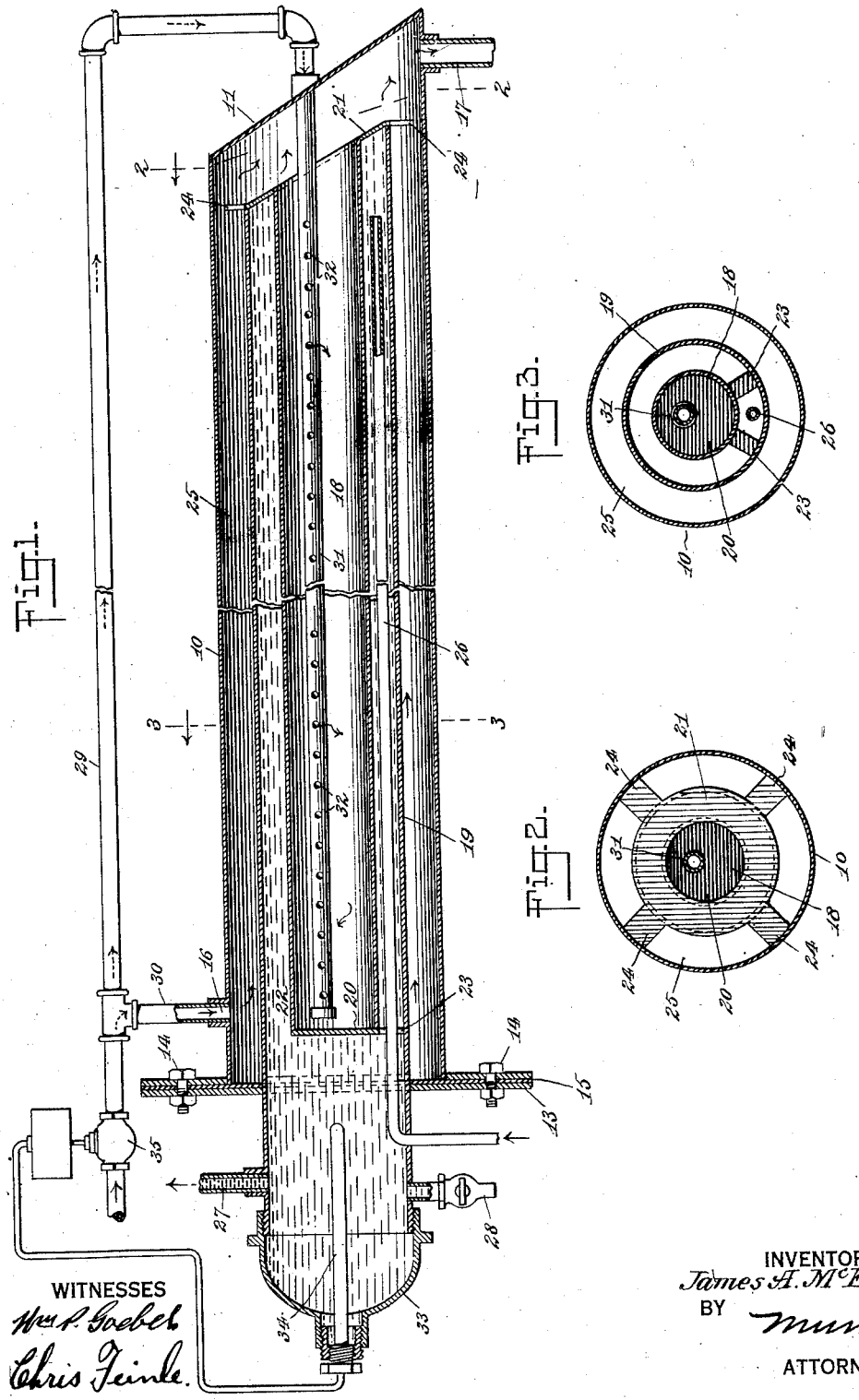
INVENTOR
James A. McElroy
BY
ATTORNEYS
WITNESSES Patented Feb. 9, 1932

1,844,776

UNITED STATES PATENT OFFICE

JAMES ARTHUR McELROY, OF ELIZABETH, NEW JERSEY

WATER HEATER

Application filed August 27, 1930. Serial No. 478,182.

This invention relates to a water heater and has especial reference to water heaters of the type known as storage or instantaneous heaters which are adapted to be connected with the circulating system of a steam heating plant.

An object of the invention is the provision in a heater of the indicated character of improvements in construction whereby the thermal efficiency thereof will be increased.

Another object of the invention is the provision of improvements whereby a considerable quantity of water may be kept at the desired temperature ready for use, and whereby the inflowing cold water which takes the place of the outflowing hot water will be heated almost instantly enabling constant withdrawal of hot water.

Another object of the invention is the provision of improvements whereby overheating is prevented.

With the foregoing and other objects in view the invention resides in the particular combination, construction and functions of the parts hereinafter fully described and illustrated in the accompanying drawings, in which:

Figure 1 is a longitudinal section of a water heater embodying the features of the invention, certain parts being shown in elevation;

Figure 2 is a transverse section on the line 2—2 of Figure 1;

Figure 3 is a transverse section on the line 3—3 of Figure 1.

Referring now more particularly to the drawings, it will be apparent that there is shown a steam cylinder or shell 10 closed at one end as at 11, and the opposite end thereof being provided with an external flange 12 to which is bolted a plate 13, as at 14, the plate having an opening therein, and a gasket 15 being arranged between the plate 13 and the flange 12. The cylinder or shell 10 has a steam inlet 16 at the top near one end thereof, and a steam and condensate outlet 17 at the bottom near the opposite end thereof. A water and steam chambered unit is associated with the cylinder or shell 10 and extends within the latter. The said unit includes a heating tube or cylinder 18 which is surrounded by a water jacket, shell or cylinder 19. The heating tube or cylinder 18 is shorter than the jacket 19, one end of the tube 18 being closed as at 20, and the opposite end being open and joined to the jacket 19 by a plate 21. The tube 18 is smaller in diameter than the jacket 19 which provides a water space 22. The closed end of the tube 18 has radial members 23 which serve with the plate 21 to maintain the tube in the proper spaced relation with respect to the jacket. The jacket 19 fits the opening in the plate 13, the gasket 15 being in contact therewith. The inner end of the jacket 19 has radial members 24 which may be formed on the plate 21 and said members 24 in contact with the shell 10 serve with the plate 13 to maintain the jacket in proper spaced relation with respect to the shell 10. It will be apparent that the jacket 19 is smaller in diameter than the shell 10 and therefore there is provided a steam space 25 which communicates with the open end of the heating tube 18. Cold water inlet means in the form of a pipe 26 extends into the jacket 19 longitudinally thereof, and terminating a short distance from the closed end of the jacket at the bottom thereof. The jacket 19 is also provided with a hot water outlet 27 on the top thereof exteriorly of the steam shell 10. The jacket 19 is also provided with a drain 28.

In order to supply steam to the space 25, and also to introduce steam into the tube 18 for the purpose of heating the water space 22 there are provided steam connections forming a part of the circulatory system of a steam heating plant. These steam connections include a supply pipe 29 having a branch pipe 30 which leads to the inlet 16, and said pipe 29 being connected with a tube or pipe 31 which extends within the tube 18 longitudinally thereof. The pipe 31 has a multiplicity of perforations or holes 32 therein for the escape of live steam into the tube or cylinder 18. It is to be understood that the outlet 17 will be connected with the trap forming a part of the circulatory system.

In accordance with another feature of the invention thermostatic means is provided for controlling the flow of live steam to the steam space 25 and the tube 31. To this end the jacket 19 is provided with a removable cap 33 to which is fitted a thermostatic bulb 34. The bulb 34 projects into the water space 22 and is operatively connected with a regulating valve 35 in the steam pipe 29. It will therefore be apparent that the water within the space 22 may be kept at the desired temperature by reason of the thermostatic means which regulates the flow of steam and also prevents overheating.

From the foregoing it will be apparent that the heater of the present invention will be automatic in operation, the cold water being conveyed into the water space through the pipe 26, and hot water being drawn off at will from the hot water outlet 27, the cold water replacing the hot water drawn off from time to time. Thus a considerable amount of water at the desired temperature will be kept in readiness at all times, and the inflowing cold water, being heated almost instantaneously, enabling the hot water to be drawn off.

What is claimed is:

1. A water heater having the combination of a steam shell having a steam inlet and a steam outlet, a closed water chambered shell extending within said steam shell, and a steam supply tube extending into said water chambered shell and having steam outlet means within said shell, said water chambered shell having a cold water inlet and a hot water outlet.

2. A water heater having the combination of a steam cylinder having a steam inlet and a steam outlet, a shell having a water chamber and a steam chamber extending into said steam cylinder, said water chamber being provided with cold water inlet means and hot water outlet means, said steam chamber being in communication with the interior of said steam cylinder.

3. A water heater having the combination of a steam cylinder having a steam inlet and a steam outlet, a shell having a water chamber and a steam chamber extending into said steam cylinder, said water chamber being provided with cold water inlet means and hot water outlet means, said steam chamber being in communication with the interior of said steam cylinder, and a steam supply pipe extending into said steam chamber.

4. A water heater having the combination of a steam shell provided with steam inlet and outlet means, a shell having a water chamber and also a steam chamber, the steam chamber being surrounded by the water chamber, said second shell extending into said steam shell, said water chamber being provided with cold water inlet means and hot water outlet means, and said steam chamber being in communication with the interior of said steam shell.

5. A water heater having the combination of a steam shell provided with steam inlet and outlet means, a shell having a water chamber and also a steam chamber, the steam chamber being surrounded by the water chamber, said second shell extending into said steam shell, said water chamber being provided with cold water inlet means and hot water outlet means, and said steam chamber being in communication with the interior of said steam shell, and a steam supply pipe extending into said steam chamber.

6. A water heater having the combination of a steam cylinder having a steam inlet and a steam outlet, a shell having a water chamber and a steam chamber extending into said steam cylinder, said water chamber being provided with cold water inlet means and hot water outlet means, said steam chamber being in communication at one end with the interior of said steam cylinder.

7. A water heater having the combination of a steam shell provided with steam inlet and outlet means, a shell having a water chamber and also a steam chamber, the steam chamber being surrounded by the water chamber, said second shell extending into said steam shell, said water chamber being provided with cold water inlet means and hot water outlet means, said steam chamber being open at one end and said end being in communication with the interior of said steam shell, and a perforated steam supply pipe extending into the steam chamber.

8. A water heater having the combination of a steam shell having a steam inlet and an outlet for steam and condensate, a water chambered shell extending within said steam shell, steam supply means leading to said steam inlet and also extending into said water chambered shell, and said water chambered shell having a cold water inlet and a hot water outlet.

9. A water heater having the combination of a steam shell having a steam inlet and a steam outlet, a water chambered shell extending within said steam shell, a perforated steam supply tube extending into said water chambered shell, said water chambered shell having a cold water inlet and a hot water outlet, and means for controlling the admission of steam into said steam inlet and said tube.

10. A water heater having the combination of a steam shell having a steam inlet and a steam outlet, a water chambered shell extending within said steam shell, a perforated steam supply tube extending into said water chambered shell, said water chambered shell having a cold water inlet and a hot water outlet, and thermostatic means for controlling the admission of steam into said steam inlet and said tube.

JAMES ARTHUR McELROY.